United States Patent [19]
Aruga et al.

[11] Patent Number: 5,303,102
[45] Date of Patent: Apr. 12, 1994

[54] DISK DRIVE APPARATUS HAVING HEAD GUARD

[75] Inventors: Tomoe Aruga; Kenji Okuhara, both of Suwa, Japan

[73] Assignee: Seiko Epson Corporation, Tokyo, Japan

[21] Appl. No.: 894,834

[22] Filed: Jun. 8, 1992

[30] Foreign Application Priority Data

| Apr. 24, 1991 | [JP] | Japan | 4-131554 |
| Jun. 7, 1991 | [JP] | Japan | 3-136183 |
| Jun. 24, 1991 | [JP] | Japan | 3-151521 |
| Jun. 24, 1991 | [JP] | Japan | 3-151522 |
| Jun. 24, 1991 | [JP] | Japan | 3-151523 |

[51] Int. Cl.$^5$ .................. G11B 5/54; G11B 21/22
[52] U.S. Cl. .................................. 360/105; 360/135
[58] Field of Search ............................ 360/105, 135

[56] References Cited

U.S. PATENT DOCUMENTS

| 4,604,666 | 8/1986 | Kitahara et al. | 360/105 |
| 4,636,896 | 1/1987 | Takikawa | 360/105 |
| 4,750,063 | 6/1988 | Kume et al. | |
| 4,750,065 | 6/1988 | Masaki et al. | 360/105 |
| 4,965,685 | 10/1990 | Thompson et al. | 360/105 |
| 4,987,506 | 1/1991 | Uehara | 360/105 |
| 5,060,101 | 10/1991 | Isomura | 360/105 |

*Primary Examiner*—Thomas E. Denion
*Attorney, Agent, or Firm*—Oliff & Berridge

[57] ABSTRACT

A disk drive apparatus for recording and reproducing desired information on and from floppy disks, is simply and thinly structured and has an excellent shock resistance. The disk unit includes a support for carrying a pair of heads for pinching a magnetic disk from both sides thereof and for reading and writing information thereon supported on respective carriages that can move the pair of heads to a desired track on the disk, and a holder, supported by the support, for storing a disk cartridge. The holder is provided with a head guard movable between a guarding position where the head guard is inserted between the pair of heads to prevent the pair of heads from abutting each other and a withdrawn position where the head guard is withdrawn from between the pair of heads, and a spring for urging and moving the head guard to the guarding position. The head guard moves from the guarding position to the withdrawn position when one end of the disk cartridge to be stored in the holder abuts with a part of the head guard.

18 Claims, 11 Drawing Sheets

*PRIOR ART*

Fig. 10

*PRIOR ART*

Fig. 11

PRIOR ART

DISK DRIVE APPARATUS HAVING HEAD GUARD

CROSS-REFERENCE TO RELATED APPLICATIONS

This application is related to U.S. patent application Ser. Nos. 07/894,835 entitled Disk Drive Apparatus Having Carriage Driving Mechanism, to Tomoe Aruga et al and 07/894,829 entitled Disk Driving Motor and Chucking Mechanism for Disk Drive Apparatus, filed concurrently herewith. These applications are incorporated herein by reference.

BACKGROUND OF THE INVENTION

1. Field of the Invention

This invention relates to a disk drive apparatus for recording and reproducing desired information on and from, for example, a floppy disk.

2. Description of Related Art

Figure 10:
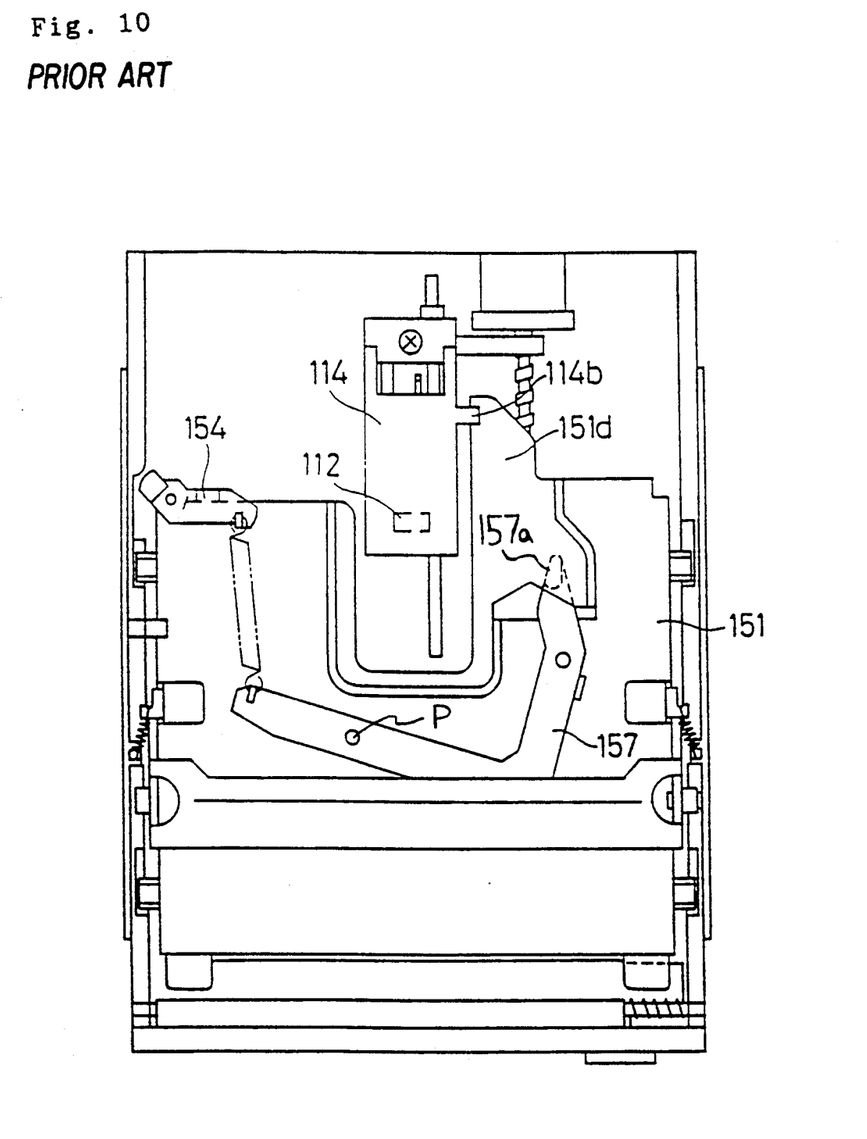
FIG. 10 is a schematic plan view of a conventional disk drive apparatus
Figure 11:
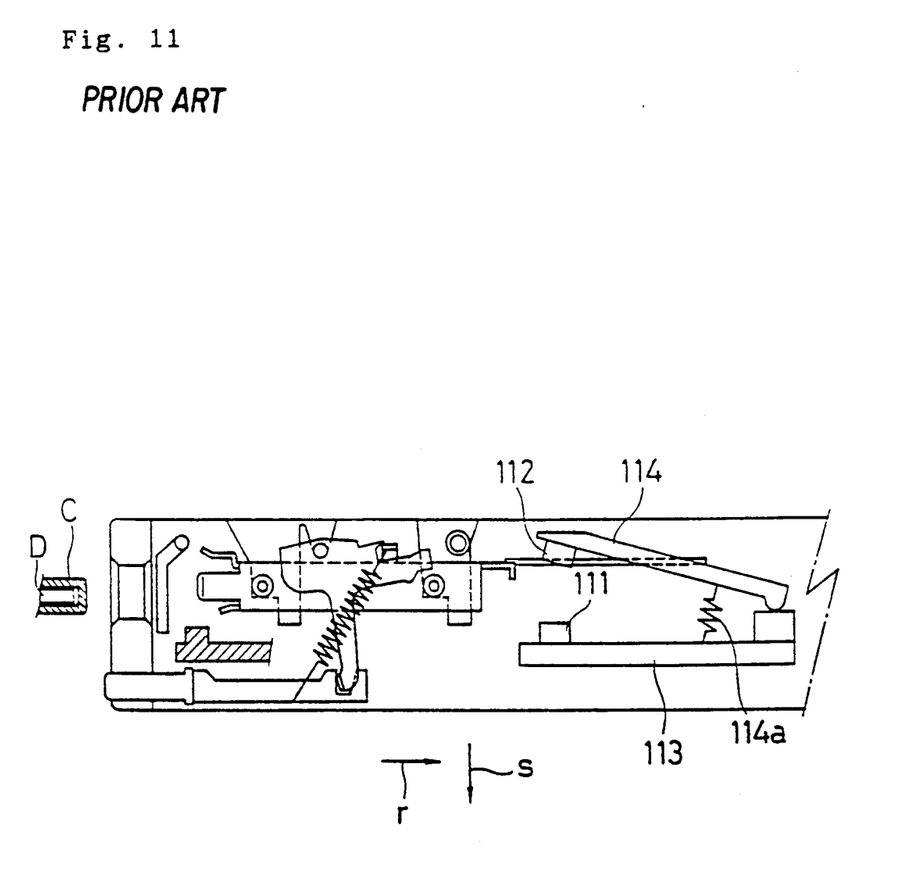
FIG. 11 is a schematic longitudinal sectional view of the conventional disk drive apparatus.

FIGS. 10 and 11 show one example of a conventional disk drive apparatus. FIG. 10 is a schematic plan view of the conventional disk drive apparatus in which no disk cartridge is mounted. FIG. 11 is a longitudinal sectional view of a main portion of the disk drive apparatus.

In FIGS. 10 and 11, a first carriage 113 having a first head 111 for pinching and moving on a magnetic disk D stored in a disk cartridge C, and for carrying out recording and reproducing magnetically, carries a second carriage 114 having a second head 112. The second carriage 114 and second head 112 are pressed in the direction of arrow S in FIG. 11 by a pressing means, such as spring 114a.

A lifting part 114b which protrudes from the second carriage 114 is engaged with a supporting part 151d of a holder 151 and is supported by the holder 151. The holder 151 is provided with a shutter lever 157 which is freely pivotal about point P. Holder 151 is also provided with a trigger 154, and is structured so that it can move while it is receiving the disk cartridge C.

To move the cartridge C to a position for recording-/reproducing, the cartridge C is inserted into holder 151 in the direction of arrow r in FIG. 11. A shutter C1 of cartridge C (shown in FIG. 9) is opened by the shutter lever 157 which rotates when one end of the cartridge C abuts it. In particular, a shutter pin 157a engages a side C1a of shutter C1, and moves shutter C1 in the direction of arrow d as cartridge C is inserted so as to open shutter C1. When the end of the cartridge abuts on the trigger 154, holder 151 moves, by the action of the trigger mechanism, to mount the cartridge C in the predetermined recording/reproducing position. At this time, the first head 111 and the second head 112 pinch the magnetic disk D to perform recording and reproducing.

Figure 12:
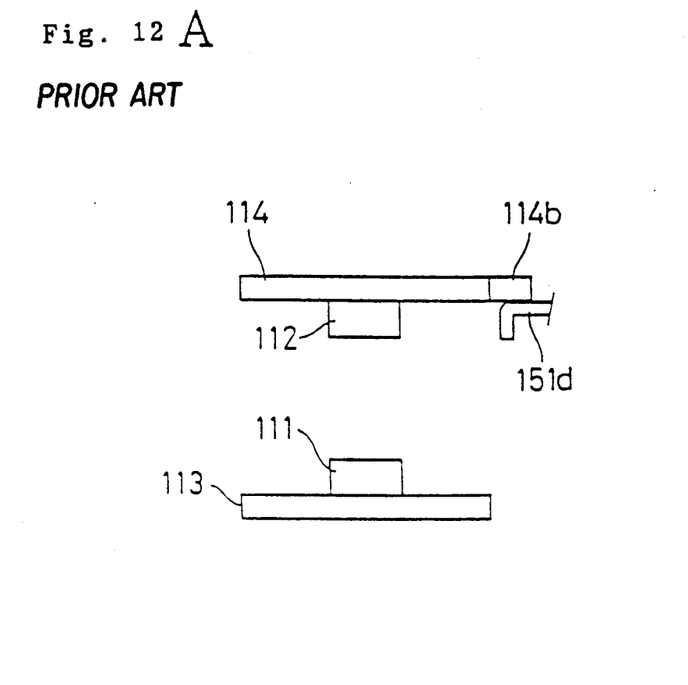
FIGS. 12A and 12B illustrate undesirable cartridge and head displacement which can occur with conventional disk drive apparatus.

However, when the whole body of the conventional disk drive apparatus as described above is dropped in the direction of the arrow s in FIG. 11 or the second carriage 114 is struck or pressed in the direction of the arrow T as shown in FIG. 12B, the second carriage 114 inclines largely in the direction of the arrow u as shown in FIG. 12B from the normal state shown in FIG. 12A. The arm 151d of the holder 151 can also deflect a great deal and in some cases, the first head 111 and the second head 112 contact each other, thereby damaging the heads. Moreover, there is a possibility of an excessive strain being applied to the lifting part 114b, thereby breaking it.

These problems are further aggravated because computers are more and more being down-sized, thinned and lightened in weight in the field of small portable computers. Since portable computers, from their nature and purpose, are carried to various places, they have a higher chance of receiving shocks due to being dropped, for example. Some measures against such shock have been taken for the computers, and the same requirement is true of disk drive apparatus.

Especially in the thin type of disk drive apparatus, the first head 111 and the second head 112 are apt to be contacted with each other because the gap between the heads is reduced, thereby bringing about damage to the heads, which are critical to the drive apparatus.

Furthermore, there is a limit to rigidly securing the holder 151 for storing the disk cartridge C, and it is not easy to control its deflection and the like when it receives shocks. It has thus become an important issue to improve the shock resistance of the unit.

OBJECT AND SUMMARY OF THE INVENTION

Accordingly, it is an object of the present invention to solve the aforementioned problems by providing a thin type disk drive apparatus having a simple structure and an excellent shock resistance.

In order to achieve the aforementioned and other objects, and to overcome the shortcomings set forth above, the disk drive apparatus of the present invention is comprised of a frame portion for carrying a pair of heads for pinching a magnetic disk from both sides thereof so as to be capable of reading and writing information thereon, and for supporting carriages, upon which the heads are mounted, which move the pair of heads to a desired track on the disk, and a holder, supported by the frame part, for holding a disk cartridge. The holder is provided with a head guard which is movable between a guarding position where the head guard is inserted between the pair of heads to prevent the pair of heads from abutting each other, and a withdrawn position where the head guard is withdrawn from between the pair of heads. Means, such as a spring, for urging and moving the head guard to the guarding position is provided. The head guard is moved from the guarding position to the withdrawn position when one end of a disk cartridge to be placed in the holder abuts with a part of the head guard.

With the above described structure, in the present invention, the head guard is positioned between the pair of heads and prevents them from abutting each other when a disk cartridge in which a magnetic disk is stored is not mounted in the holder.

When the disk cartridge is mounted in the holder, one end of the disk cartridge abuts with one end of the head guard and moves the head guard to the withdrawn position, so that it will not prohibit the recording or reproducing of information.

The above and other advantages of the invention will become more apparent upon review of the following description and the accompanying drawings.

BRIEF DESCRIPTION OF THE DRAWINGS

The invention will be described in detail with reference to the following drawings in which like reference numerals refer to like elements and wherein.

DETAILED DESCRIPTION OF THE PREFERRED EMBODIMENTS

Referring now to the drawings, one preferred embodiment of a disk drive apparatus according to the present invention will be described.

FIGS. 1, 2, 3 and 4 are exploded perspective views illustrating one illustrative embodiment of a disk drive apparatus constructed according to the present invention. These Figures show respective portions of the disk drive apparatus, with like elements being referred to with like reference numerals in the Figures.

The disk drive apparatus includes a carriage mechanism 10 (see FIG. 4), a carriage driving mechanism 20 (see FIG. 4), a disk rotating and driving mechanism 30 (see FIG. 3), a control circuit board 40 (see FIG. 3), a disk mounting mechanism 50 (see FIG. 2) and other elements as shown in FIGS. 1 through 4.

Figure 4:
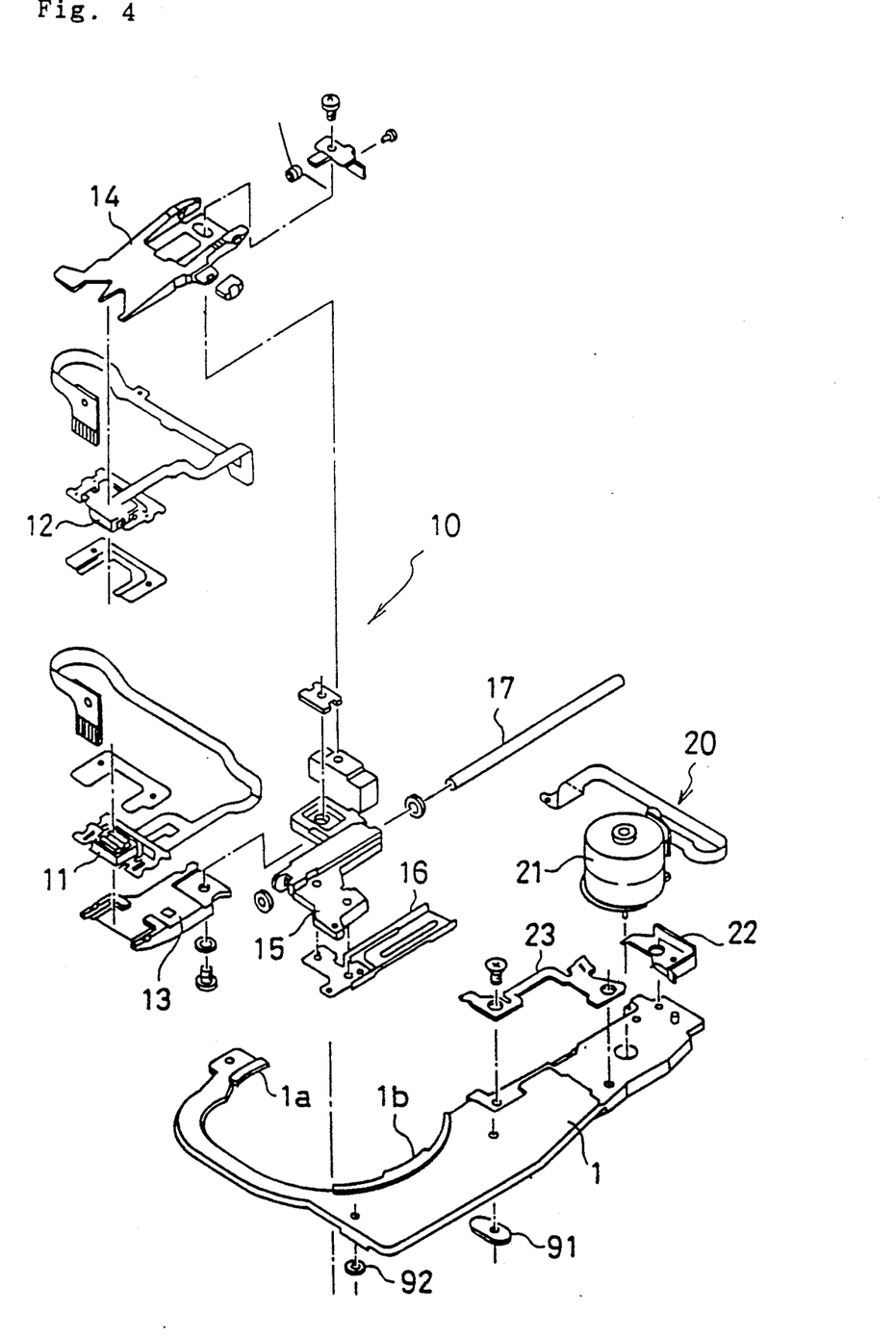
FIG. 4 is an exploded perspective view illustrating a further portion of the illustrative embodiment.

The carriage mechanism 10 is comprised of a first head 11 and a second head 12 for recording and reproducing information by slidably contacting with a disk mounted within the apparatus with a predetermined pressure. A first carriage 13 and a second carriage 14 for carrying each respective head are also included in the carriage mechanism. A carriage main body 15 is attached to both carriages. A guide shaft 17 inserted through the carriage main body 15 guides the main body 15 as it is moved in the radial direction of the disk as is well known. A rack plate 16 attached to the carriage main body 15 extends radially outward from the disk.

The carriage driving mechanism 20 is comprised of a step motor 21 which is provided with a pinion for moving and positioning the carriage mechanism 10 by engaging with the rack plate 16. Driving mechanism 20 also includes fixtures 22 and 23 for attaching carriage main body 15 and rack plate 16 to a base 1 of the disk drive apparatus. For a more detailed description of the carriage driving mechanism, see the above incorporated U.S. patent application Ser. No. 07/894,835.

The carriage mechanism 10 and the carriage driving mechanism 20 are disposed on, and attached to, a base 1. The base 1 is molded from a plastic material such as, for example, Polyphenylene Sulfide (PPS) resin having a relatively high rigidity, while occupying a minimum planar area. Base may be formed so as to have sufficient accuracy by typical molding processes; no additional mechanical processing, for example, is required to improve the precision of base 1.

Figure 3:
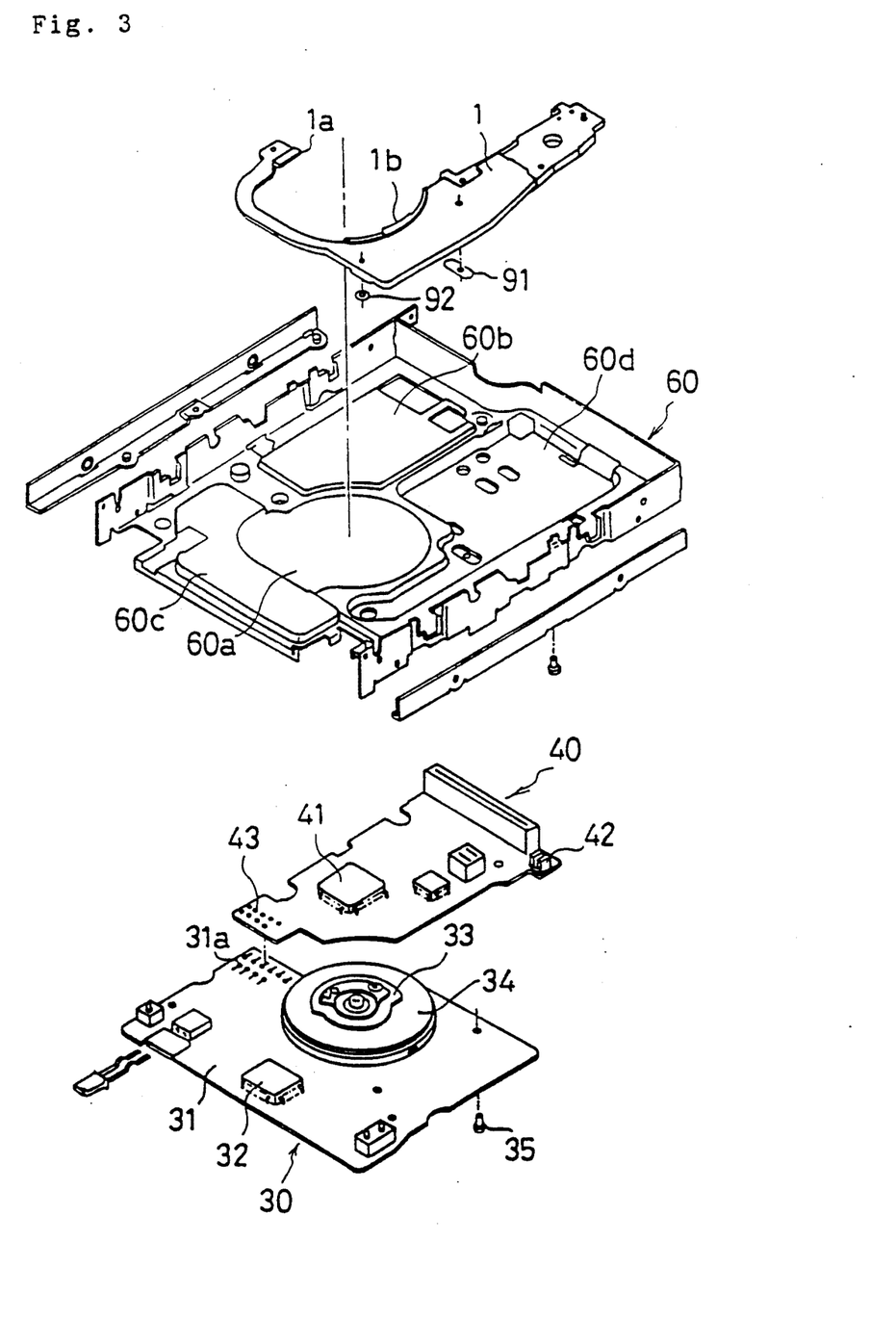
FIG. 3 is an exploded perspective view illustrating another portion of this illustrative embodiment.

With reference to FIG. 3, the disk rotating and driving mechanism 30 rotates and drives a disk mounted within the apparatus with a predetermined speed and is comprised of a rotation control circuit board 31 on which a rotation control device 32 and other typical elements are mounted. A chucking hub 33 for securing and transmitting a rotating force to the disk in a predetermined manner is provided on a rotor of motor 34. For a more detailed description of the disk driving mechanism, see the above incorporated U.S. patent application Ser. No. 07/894,839. Additional circuitry (not shown) is also provided on circuit board 31. Land patterns 31a are provided on portions of the signal lines on rotation control circuit board 31 so that the signal lines can be readily soldered to other members.

The control circuit board 40 is connected with the disk rotating and driving mechanism 30 so as to transmit and receive signals therewith. Board 40 also controls the carriage driving mechanism 20, the first head 11 and the second head 12 to control the recording and reproducing of information. A control device 41, a sensor (type-TK00) 42 for setting a reference position for the carriage mechanism 10 and other typical elements are mounted and disposed on the control circuit board 40. Solder banks such as through holes 43 are provided on a portion of the signal lines on board 40 at positions which correspond to the aforementioned land patterns 31a on board 31. The solder banks function as a means for allowing the signal lines on board 40 to be coupled (e.g., via soldering) to the land patterns 31a on board 31.

Figure 1:
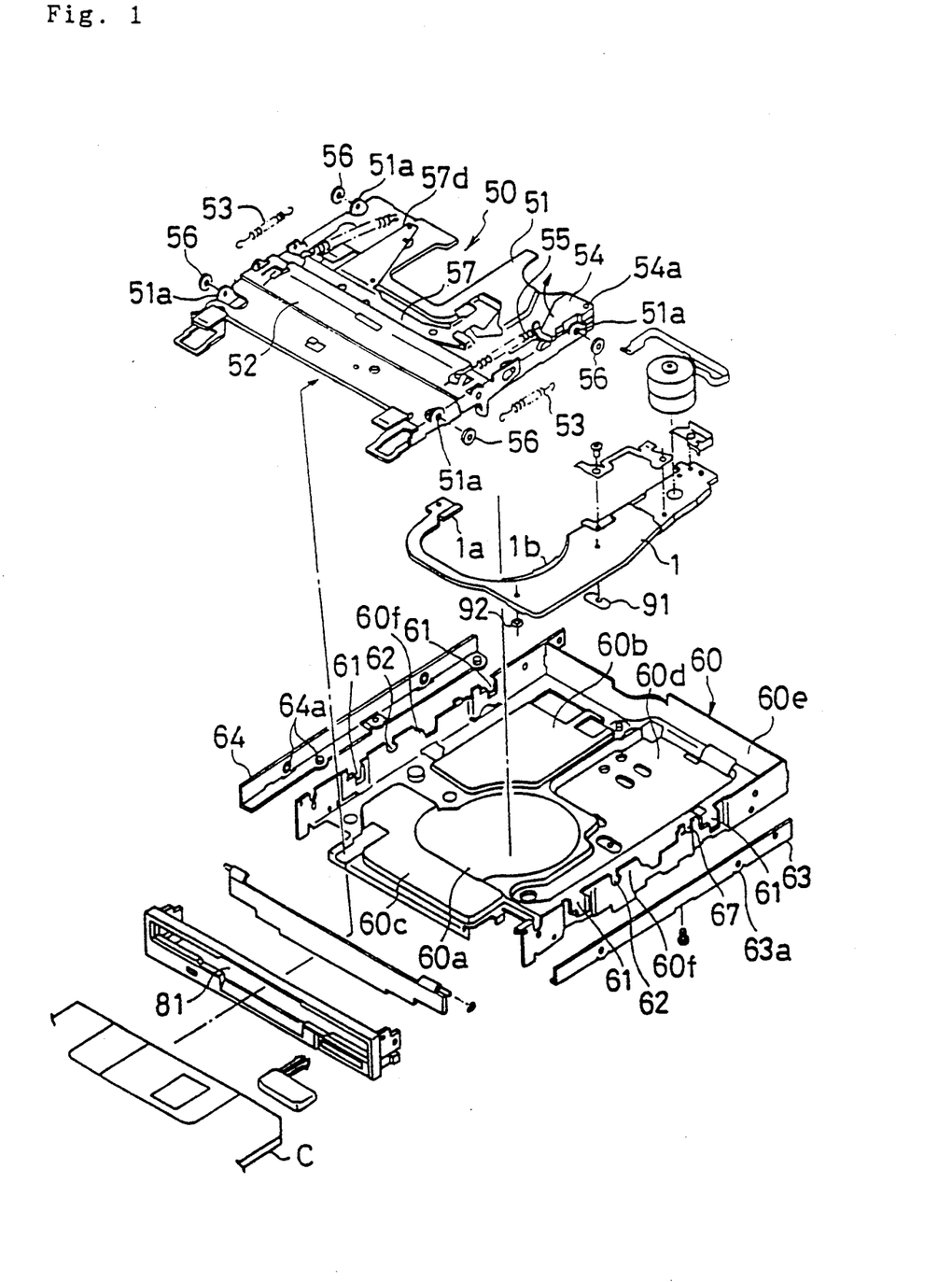
FIG. 1 is an exploded perspective view illustrating a portion of an illustrative embodiment of a disk drive apparatus according to the present invention.
Figure 2:
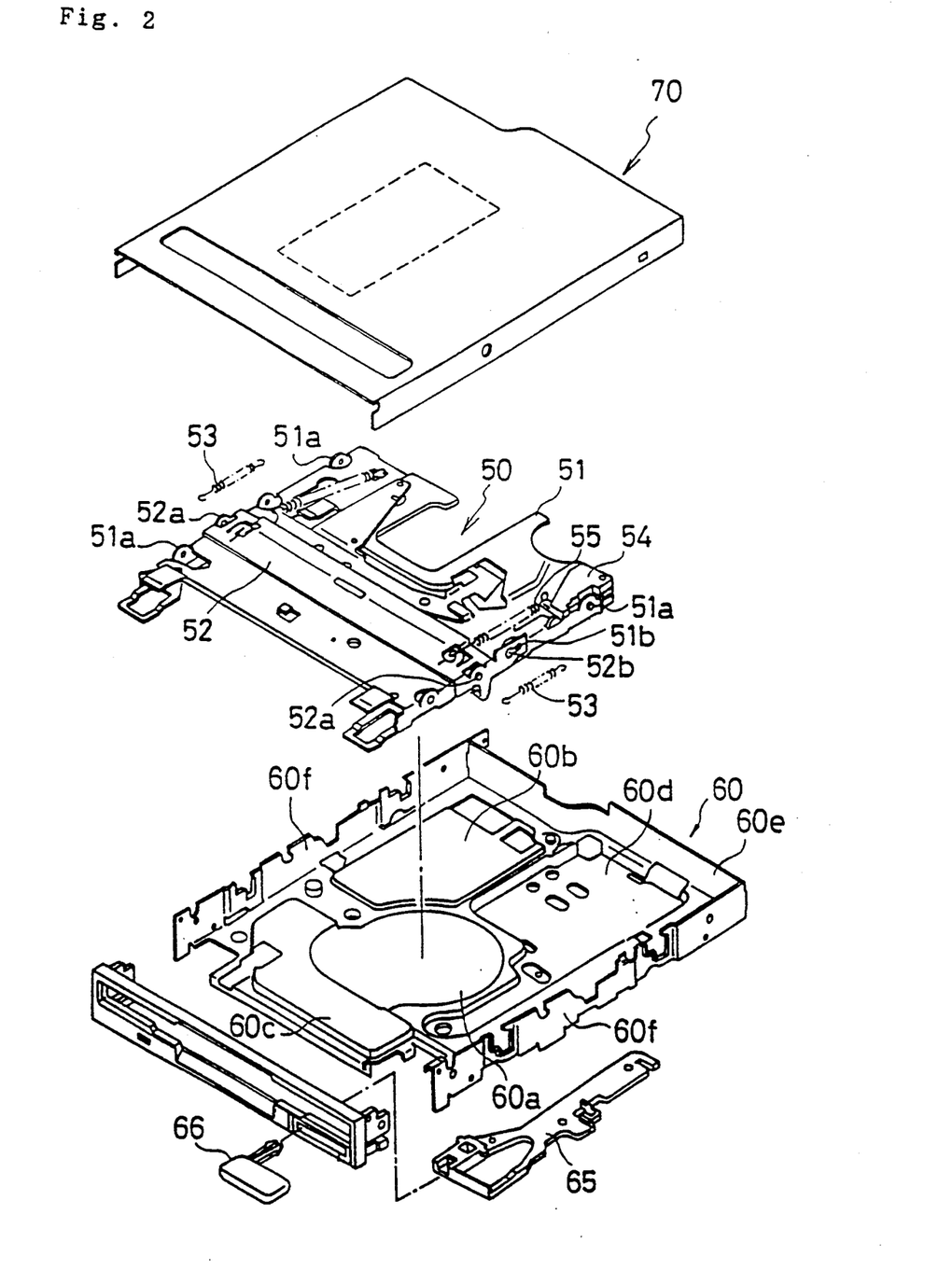
FIG. 2 is an exploded perspective view illustrating another portion of the FIG. 1 embodiment.

With reference to FIGS. 1 and 2, the disk mounting mechanism 50 receives the disk cartridge within the disk drive apparatus, and positions and holds the disk cartridge at a predetermined recording/reproducing position therein. Disk mounting mechanism includes a holder 51 structured in a manner to be movable to a first position for inserting/removing the disk cartridge and to a second position for recording/reproducing on the disk. A lifter 52, linked with the holder 51 through a pair of protrusions 51b of the holder 51 inserted through a pair of track holes 52b which are extensions of the lifter 52 which engage with the protrusions 51b is also provided in disk mounting mechanism 50 for activating the motion of the holder 51. Springs 53 having one end attached to the lifter 52 and the other end attached to a shielding case 60 (which is described later) partially controls the movement of holder 51. A trigger 54 for detecting that the disk cartridge has been inserted to a predetermined position within holder 51 and for allowing the holder 51 to be moved is also provided as a portion of disk mounting mechanism 50.

Trigger 54 is mounted on holder 51 for rotation about pivot point 54a. A spring 55 for urging counterclockwise rotation of trigger 54, as well as movement of holder 51 in one direction is attached between the trigger 54 and the lifter 52.

A plurality of protrusions 51a which engage with the shielding case 60 (which will be described later) are formed on the holder 51. A pair of protrusions 52a which similarly engage with the shielding case 60 are formed on the lifter 52.

The holder 51 is structured so that it is moved automatically to the recording/reproducing position by the activation of the trigger 54 when a disk cartridge (not shown) is inserted to the predetermined position within the holder 51. Holder 51 is moved from the recording-/reproducing position to the disk cartridge inserting-/removing position, upon forward movement of an ejecting arm 65, which is attached to lifter 52 and is moved forward when a user presses an eject button 66. Thus, ejecting arm 65 transmits a pressing manipulation force from the eject button 66 to the lifter 52.

Each main mechanism described above is stored and disposed within the shielding case 60. Shielding case 60 has a size that comprises almost the entire plane area of the apparatus, and is made from sheeting such as a light alloy aluminum material.

Formed in the shielding case 60 are a concave portion 60d in which base 1 is placed, and on which the carriage mechanism 10 and the carriage driving mechanism 20 are assembled. (Carriage mechanism 10 and carriage driving mechanism 20 are attached to base 1 as set forth above.) An opening 60a is provided through which the motor 34 of disk rotating mechanism 30 is inserted. A projection 60c forms a space for receiving the rotation control device 32 (on the lower surface of case 60) and other elements mounted and disposed on the rotation control circuit board 31. A projection 60b forms a space for receiving the control device 41 (on the lower surface of case 60) and other elements mounted and disposed on the control circuit board 40. Thus, each mechanism is arranged so that no dead space is created in the direction of the thickness of the apparatus.

Although the planar strength of shielding case 60 is increased due to its irregular shape described above, a rear side wall 60e and right and left side walls 60f are formed to further increase the rigidity of shielding case 60.

Formed on the right and left side walls 60f are a plurality of guide grooves 61 for engaging with the plurality of protrusions 51a formed on the holder 51 to guide the motion of the holder 51. A pair of supporting grooves 62 for engaging with the pair of protrusions 52a formed on the lifter 52 form a rotation supporting point of the lifter 52 on shielding case 60. The disk mounting mechanism 50 is structured so that it, in an assembled state, may be assembled to the shielding case 60 from above in the figures.

As shown in FIG. 3, the disk rotating mechanism 30 and the control circuit board 40 are mounted from below the shielding case 60, with motor 34 being inserted through the opening 60a. Base 1 on which the carriage mechanism 10 and the carriage driving mechanism 20 are disposed is mounted from above the shielding case 60. Portions of mechanism 30, board 40, base 1, and case 60 are fastened together by a plurality of screws 35 near the center of rotation axis of motor 34 of the disk rotating mechanism 30 as shown in FIG. 3.

In disk drive apparatus, as in the present embodiment, in which a disk is mounted and driven to rotate, and a first head 11 and a second head 12 slidably contact the disk with a certain pressure to record or reproduce information thereon, a relative height position of the first head 11 and the second head 12 relative to the disk placed on the chucking hub 33 plays an important role for ensuring proper recording or reproducing of information. In the present embodiment, as a positive adjusting means for precise adjustment of the relative height position, replaceable spacers 91 and 92, for which several kinds of thicknesses are provided, are placed between the shielding case 60 and the base 1, and are fastened and fixed by the plurality of screws 35 near the center of the rotation axis of the disk rotating mechanism 30 as described above.

Referring to FIG. 2, a cover 70 is provided above shielding case 60 for covering the shielding case 60. The cover 70 covers the plurality of guide grooves 61 and the pair of supporting grooves 62 and together with case 60 defines a space, from which dust and other particles are prevented from entering even though it is not sealed.

Furthermore, mountings 63 and 64, having a plurality of fixing screw holes 63a and 64a for fixing the disk drive apparatus to other devices, are disposed at both the right and left sides of the shielding case 60 to absorb, for example, fixing strain when the disk drive apparatus is fixed to other devices, for example, within a portable computer. Mountings 63 and 64 prevent the propagation of such strain toward the shielding case 60.

Referring now to FIGS. 5 through 8, an example of a head guard for use with the disk drive apparatus, and operations for inserting and removing the disk cartridge from the disk drive apparatus will be described.

Figure 5:
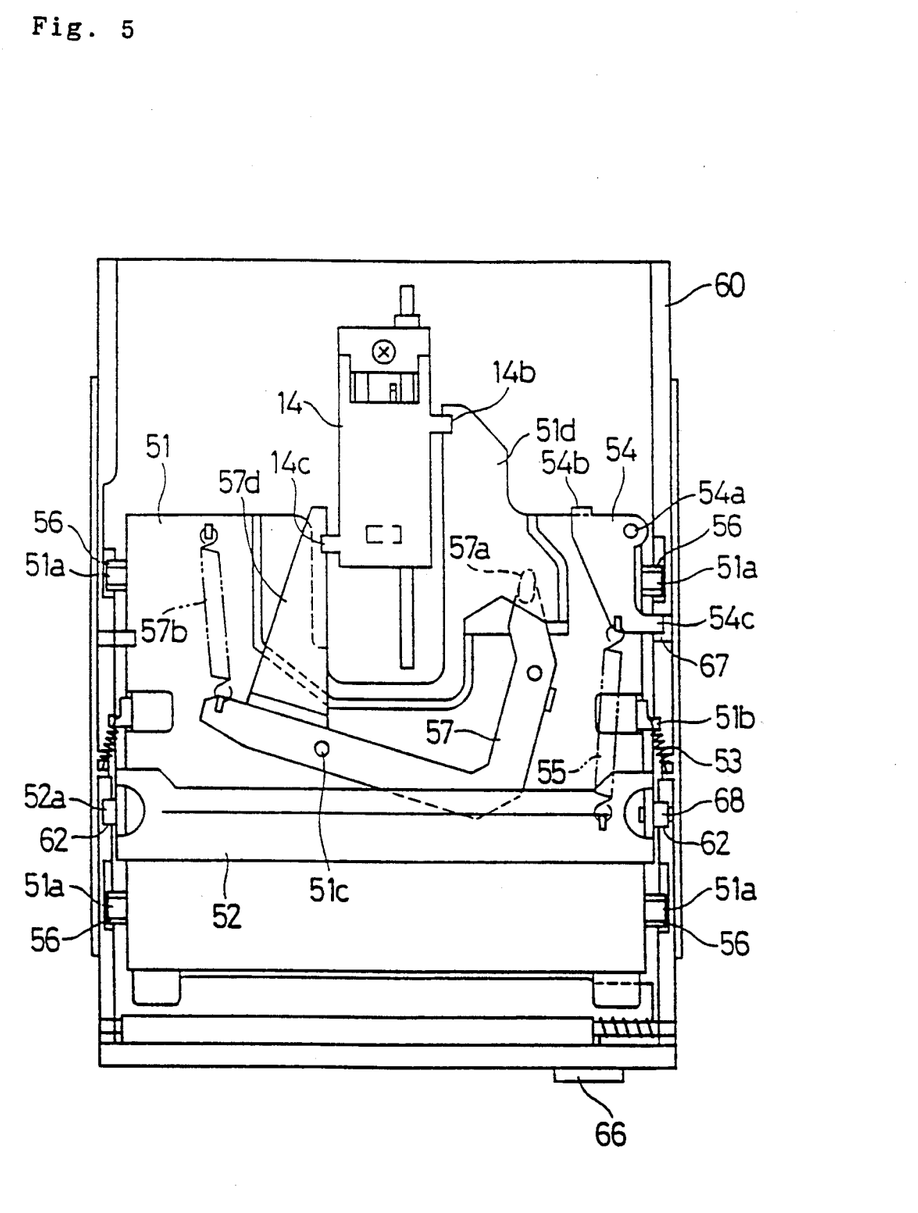
FIG. 5 is a schematic plan view of the illustrative embodiment when no disk cartridge is mounted therein.
Figure 6:
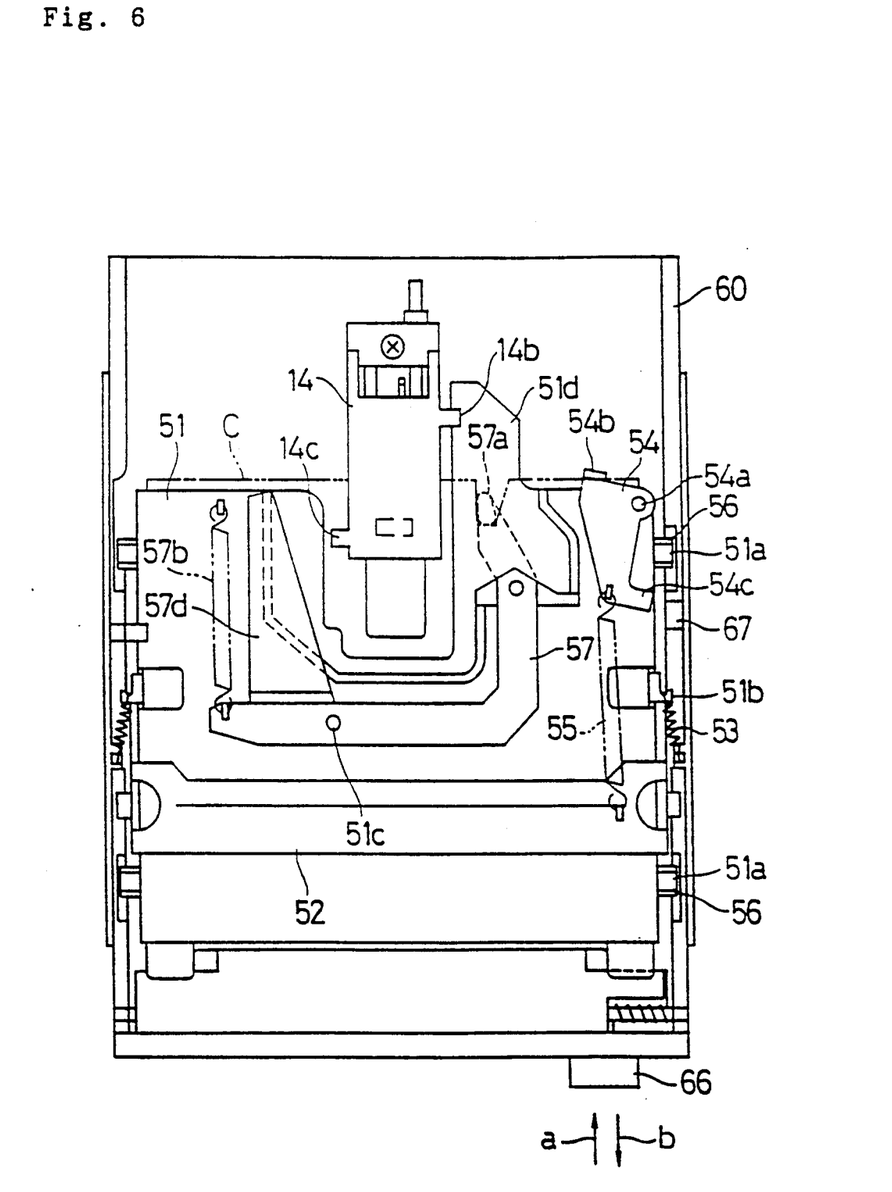
FIG. 6 is a schematic plan view of the illustrative embodiment when a disk cartridge is mounted therein.
Figure 7:
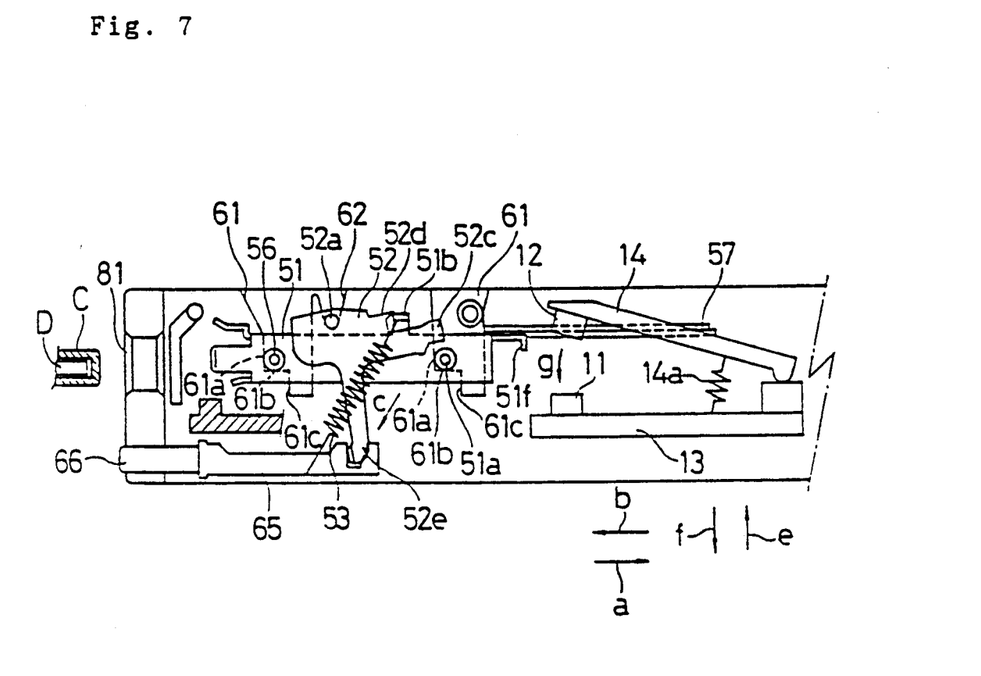
FIG. 7 is a schematic longitudinal sectional view of the illustrative embodiment when no disk cartridge is mounted therein.
Figure 8:
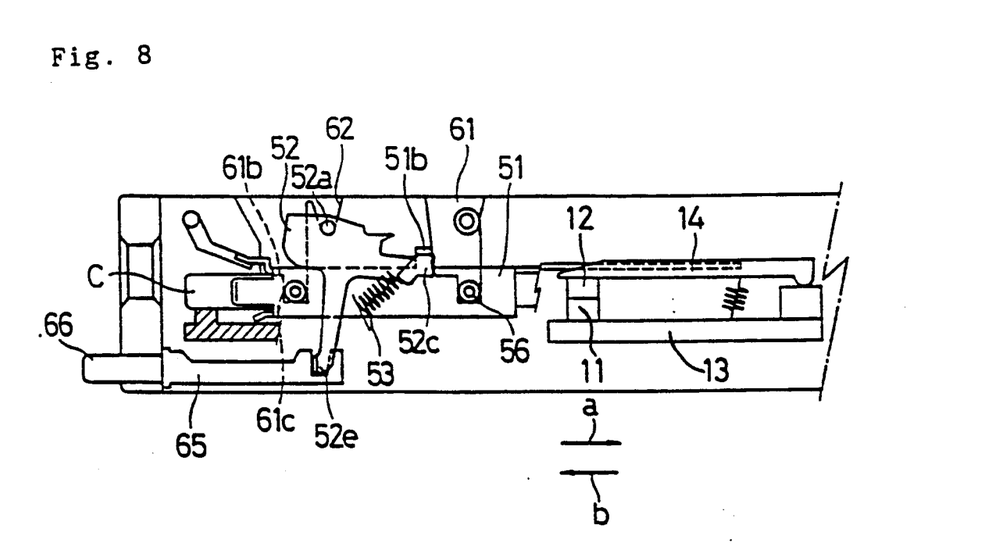
FIG. 8 is a schematic longitudinal sectional view of the illustrative embodiment when a disk cartridge is mounted therein.

FIG. 5 is a schematic plan view of the disk drive apparatus of the present invention when it is assembled and when no disk cartridge is mounted therein. FIG. 6 is a schematic plan view of the disk drive apparatus when the disk cartridge is mounted. FIGS. 7 and 8 are longitudinal section views of the main parts of FIGS. 5 and 6, respectively.

In FIGS. 5 and 7, a first carriage 13 having the first head 11 for pinching and moving on the disk D stored in the disk cartridge C so as to record or reproduce information therefrom carries the second carriage 14 having the second head 12, which is biased in the direction of arrow g by a pressing means 14a such as a spring. The lifting part 14b which is provided protruding from the second carriage 14 is engaged with the supporting part 51d of the holder 51, and the second carriage 14 is thus held by the holder 51.

Disposed on the upper surface of the holder 51 in a manner rotatable about a lever projection 51c provided on the holder 51 is a shutter lever 57 for selectively opening and closing a shutter C1 of the disk cartridge C. Shutter lever 57 is always urged to turn in the clockwise direction in FIG. 5 by a spring 57b.

Figure 9:
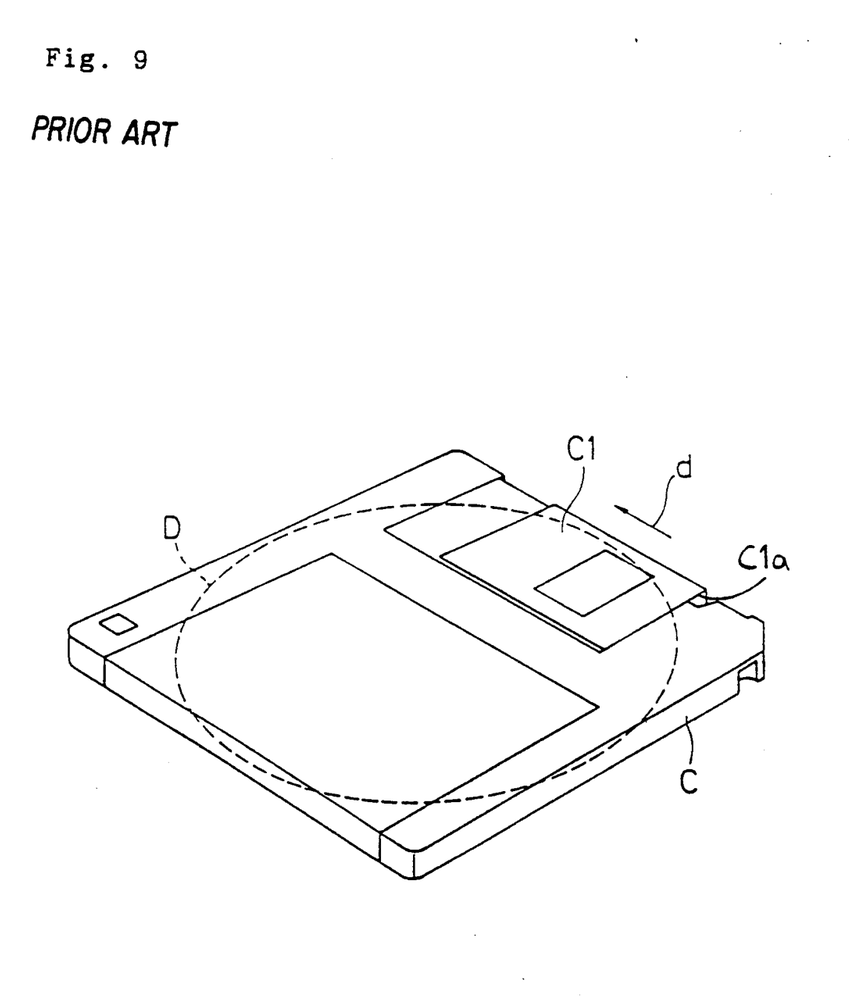
FIG. 9 is a perspective view illustrating a conventional disk cartridge.

A shutter pin 57a for abutting with the shutter C1 of the disk cartridge C to open the shutter C1 by moving it in the direction of arrow d in FIG. 9, is secured to one end of the shutter lever 57. A head guard 57d for preventing the first head 11 and the second head 12 from abutting each other is provided on the other end of the shutter lever 57. Preferably shutter lever 57, pin 57a, and guard 57d are of one-piece construction.

An arm section 14c, which faces toward the head guard 57d, is provided on the opposite side from the lifting part 14b on the second carriage 14. The head guard 57d is positioned such that it overlaps with the arm section 14c when the disk cartridge is not mounted therein, as shown in FIG. 5, at which time a gap is maintained between the arm section 14c and guard 57d as shown in FIG. 7. If a shock is applied to the carriage when, for example, the apparatus is dropped, the carriage arm section 14c abuts with the head guard 57d to block the second carriage 14 from turning, and to prevent the first head 11 and the second head 12 from abutting each other.

Movement of holder 51 will now be described. The plurality of protrusions 51a which are located in the plurality of guide grooves 61 formed on the right and left side walls 60f of the shielding case 60 as described before are formed on the sides of the holder 51. Guide rollers 56 are rotatably mounted on each of the protrusions 51a and move along sides 61a, 61b and 61c of each guide groove 61 of the shielding case 60. Furthermore, the protrusions 51b are provided on holder 51 so that they are disposed in a manner so that they slidably contact with the arm section 52c of the lifter 52 as shown in FIG. 7.

The lifter 52 is linked with the upper side of the holder 51 so that it slidably contacts with both sides of the holder 51, and can turn in the clockwise and counter-clockwise directions in FIG. 7. Rotation of lifter 52 is centered about the protrusions 52a at both sides thereof, which form turn supporting points and are supported by the supporting grooves 62 of the shielding case 60.

A tension spring 53 which functions as an urging member for partially controlling the motion of holder 51, is provided between the projections 51b and the shielding case 60. Tension spring 53 presses the holder 51 in the directions of arrows b and f as components of a force for urging the holder 51 in the direction of arrow c in FIG. 7.

The disk cartridge C is mounted to the disk drive apparatus structured as described above in the following ways.

In a stand-by state when the disk cartridge is not mounted, the holder 51 is located at the disk cartridge inserting/removing position as shown in FIGS. 5 and 7. The holder 51 is urged in the directions of arrows b and f as shown in FIG. 7 by the tension spring 53. The guide rollers 56, mounted on the protrusions 51a of the holder 51, are maintained in a state in which they are placed on the horizontal side 61b and the vertical side 61a of the guide grooves 61. In such a state, an anchoring projection 54c of the trigger 54 engages with an engaging concave portion 67 of the shielding case 60 to block the holder 51 from moving in the direction of arrow a. The lifting part 14b projected on the second carriage 14 is engaged with the supporting part 51d of the holder 51 to maintain the second carriage 14 in a lifted state.

When in the disk cartridge inserting/removing position, the shutter lever 57 is located at the position shown in FIG. 5, and the head guard 57d is located at the position where it overlaps with the arm section 14c of the second carriage 14 as shown in FIG. 5. The carriage arm section 14c abuts with the head guard 57d when a shock is applied to the carriage as described before, to block the second carriage 14 from turning and to prevent the first head 11 and the second head 12 from abutting each other.

When the disk cartridge C is inserted through an inserting opening 81 in the direction of arrow a, the leading edge of the cartridge C abuts the shutter opening/closing arm portion 57a of the shutter lever 57 shown in FIG. 5 and the shutter lever 57 turns in the counter-clockwise direction in FIG. 5, pivoting about the lever projection 51c, thereby sliding and opening the shutter C1 of the cartridge C by moving shutter C1 in the direction of arrow d (see FIG. 9). At this time, the head guard 57d turns in the same direction together with the shutter lever 57 and separates from the arm section 14c of the second carriage 14 as shown in FIG. 6, thereby moving head guard 57d from the guarding state.

When the cartridge C is further pressed into the holder 51, the leading edge of the cartridge C abuts a projection 54b of the trigger 54, thereby turning the trigger 54 in the clockwise direction in FIG. 5 about pivot point 54a so that the anchoring projection 54c of the trigger 54 is pulled out from the engaging concave section 67 of the shielding case 60, thereby releasing trigger 54 from the engaging state.

When the cartridge C is further pressed in the aforementioned direction, the leading edge of the cartridge C abuts with a stopper 51f of the holder 51 and the cartridge C then moves to the right in FIG. 7 together with the holder 51 against the force of spring 53. Then the guide rollers 56 on holder 51 come out of engagement with the horizontal side 61b and vertical side 61a of the guide grooves 61, and move downward (as shown in FIG. 7) so that the holder 51 moves in the direction of arrow f as the cartridge C and holder 51 are pressed in the direction of arrow a. The holder 51 is thereby mounted at the recording/reproducing position shown in FIGS. 6 and 8. At this time, each guide roller 56 is secured in a state abutting a vertical side 61c of the guide groove 61 by the urging force of the tension spring 53.

When the holder 51 is brought down to be mounted at the recording/reproducing position as described above, the supporting part 51d of the holder 51 drops and thereby the abutting engagement with the lifting part 14b of the second carriage 14 is released and the second carriage 14 is moved toward the first carriage 13 by the pressing means 14a. The magnetic disk D in the cartridge C is thus pinched and held between the first head 11 and the second head 12 so that recording and reproducing can be performed.

The eject button 66 is in a state pressed inside of the shielding case 60 when the disk is not mounted therein as shown in FIG. 7. When the disk cartridge C is inserted into the holder 51 as described above and is mounted in the recording/reproducing position shown in FIG. 8, the projection 51b of the holder 51 abuts the arm 52c of the lifter 52 and the lifter 52 turns in the clockwise direction in FIG. 7. Then the ejecting arm 65 which is engaged with a pressing section 52e of the lifter 52 slides in the direction of arrow b in FIG. 7 and the eject button 66 is projected toward the outside of the disk drive apparatus as shown in FIG. 8.

When the cartridge C is ejected out of the disk drive apparatus, the eject button 66 is pressed in the direction of arrow a from the state shown in FIG. 8. When the eject button 66 is so pressed, the pressing part 52e of the lifter 52 is moved via the ejecting arm 65, and the lifter 52 turns in the counter-clockwise direction in FIG. 8 about the rotating projection 52a. Due to such movement, the arm section 52c of the lifter 52 engages with the projection 51b of the holder 51 and lifts the rear section (the right most portion in FIGS. 7 and 8) of the holder 51 in the direction of arrow e. At this time, the guide rollers 56 which are mounted on the holder 51 engage with the vertical side 61c of the guide grooves 61 and block movement of holder 51 in the direction of arrow b. When the eject button 66 is pressed further, the holder 51 abuts with an anti-slip out screw 68 and centering on it, the front part (left most portion in FIGS. 7 and 8) of the holder 51 is lifted up. The guide rollers 56 come out of engagement with the vertical sides 61c, and by the action of the spring 53, the holder 51 moves along the horizontal side 61b of the guide groove 61 in the direction of arrow b and is stopped by returning to the state in which the rollers 56 abut with the vertical side 61a in the upper state shown in FIG. 7.

When the holder 51 starts to move in the direction of arrow b as described above, the trigger 54 is turned in the counter-clockwise direction in FIG. 6 by the force provided by spring 55 from the state in FIG. 6 and the trigger arm section 54b abuts with the cartridge C, ejecting the cartridge C in the direction of arrow b.

At the same time, the shutter lever 57 having the head guard 57d turns in the clockwise direction in FIG. 6 and the head guard 57d returns to its position between the first head 11 and the second head 12 to return to the state in which the heads are protected. Furthermore, the stopper 52d of the lifter 52 engages again with the projection 51b and the holder 51 is returned to the disk cartridge insertion/removing position shown in FIGS. 5 and 7.

The disk drive apparatus of the aforementioned embodiment based on the present invention has various noteworthy features in addition to the head guard mechanism described above. These features may be summarized as follows:

1) In the disk drive apparatus of the aforementioned embodiment, the shielding case 60 (provided with: the base 1 on which the carriage mechanism 10 and the carriage driving mechanism 20 are disposed; the disk rotating mechanism 30; the control circuit board 40; the disk mounting mechanism 50; and the other elements) is formed from a light alloy such as, for example, aluminum sheeting into a size that almost corresponds with the plane area of the whole apparatus, and is provided, on its right and left sides, with the mountings 63 and 64 which are provided with the plurality of fixing screw holes 63a and 64 for attaching the disk drive apparatus to other devices so as to absorb mounting strain, for example, when the unit is mounted to another device. Therefore strain is not propagated to the shielding case 60.

Accordingly, the shielding case 60 need not be made very rigid, and can be formed from a sheet of such light alloy materials as aluminum as described above. Its function may be performed even if the thickness is about 0.5 mm because the mountings 63 and 64 absorb strain. Thus, case 60 is effective at reducing the weight of this type of disk drive apparatus.

Of course, the material of the shielding case 60 is not limited only to such light alloy materials as aluminum; it may be fabricated at a low cost, for example, from a sheet of iron, provided that it does not pose a problem in reducing its weight.

2) In mounting each main mechanism to the shielding case 60 structured as described above, the disk rotating mechanism 30 and the control circuit board 40 may be mounted through the opening 60a through which the motor 34 is inserted from underneath of the shielding case 60 as shown in FIG. 3. The base 1, on which the carriage mechanism 10 and the carriage driving mechanism 20 are disposed, may be mounted from above the shielding case 60. Replaceable spacers 91 and 92 having several thicknesses may function as a position adjusting means for precisely adjusting the relative height position of the first head 11 and the second head 12 relative to the disk placed on the chucking hub 33 of the disk rotating mechanism 30. Spacers 91 and 92 are placed between the base 1 and the shielding case 60. The plurality of screws 35 near the center of the rotation axis of the motor 34 of the disk rotating mechanism 30 attach base 1, case 60, mechanism 30 and board 40 together.

Accordingly, the base 1 which permits adjustment of its position by selectively combining the replaceable spacers 91 and 92 requires no precision mechanical processing, for example, to increase the precision in alignment of its main components. This facilitates mass-production. The base 1 is sufficient as long as it is planar for disposing the carriage mechanism and the carriage driving mechanism 20. The base 1 is formed by molding a plastic having a relatively high rigidity such as PPS resin into a shape which occupies a minimum planar area. Its cost is thus very low, and its weight is light.

The base 1 may be formed not only by molding PPS resin, but also by die-casting aluminum or zinc. By doing so, precision mechanical processing, for example, is not necessary to increase its precision, and therefore the base 1 may be mass-produced with a low cost.

The base 1 can fully perform its intended function as long as it has the planar area for disposing the carriage mechanism 10 and the carriage driving mechanism 20 as described above. However, the motor 34 of the disk rotating mechanism 30 is merely inserted through a bearing (mounted to board 31) from above, and has a possibility of jumping up due to such disturbing actions as a physical shock, for example, being applied to the disk drive apparatus. Accordingly, stoppers 1a and 1b are provided on the base 1 as a means for preventing such movement. That is, the motor 34 of the disk rotating mechanism 30 mounted from below the shielding case 60 is provided with a certain gap to permit the motor 34 to freely turn. In a situation when the motor 34 is about to jump up (due to, for example, application of physical shock), the stoppers 1a and 1b abut with the motor 34 to prevent it from jumping up.

3) Although the base 1 in the embodiment has been molded from such plastic as PPS resin having a relatively high rigidity, the plastic material is not limited only to PPS resin. The shielding case 60 is provided, on its right and left sides, with mountings 63 and 64 provided with fixing screw holes 63a and 64a respectively for fixing the disk drive apparatus to other devices to absorb mounting strain when the unit is mounted to other devices to prevent propagation of the strain to the shielding case 60, as described above, so that the shielding case 60 may be made of a soft material. Furthermore, strain and other forces to each main mechanism disposed in the shielding case 60 may be also be prevented from propagating thereto. Accordingly, base 1 may be constructed from materials other than PPS resin, provided that a material is used having a desired rigidity and a thermal expansion ratio close to that of the disk by appropriately blending and filling glass, carbon fiber or filler to another plastic material. This further facilitates mass-production.

4) As for the coupling structure of the rotation control circuit board 31 and the control circuit board 40, the land patterns 31a are provided on part of the signal lines on the rotation control circuit board 31 of the disk rotating mechanism 30 to allow it to be readily soldered to another member. Solder banks are provided at a position facing the land patterns 31a on the control circuit board 40, which is connected with the disk rotating mechanism 30 for transmitting and receiving signals and for controlling the carriage driving mechanism 20, the first head 11 and the second head 12 as well as for controlling recording and reproducing. The banks are soldered and coupled with the land patterns 31a to connect the signal lines of board 31 and board 40 to each other. Therefore, no separate connecting means such as connectors need to be used for connecting board 40 to board 31. This provides not only for low cost, but also an especially simple and thin structure. It is effective at providing a disk drive apparatus occupying less space.

The arrangement for soldering and coupling in the state where those surfaces face each other permits automation of the production process. For example, if the control circuit board 40 (in which melted solder is infiltrated and solidified in the through holes 43) is aligned with the land patterns 31a, and if the solder is melted by heating locally (for example, by irradiating with a laser beam), feeding induction current, or abutting a soldering iron having a larger thermal capacity thereto, the solder flows out of holes 43 and is led by the land patterns 31a, so that the connection may be achieved stably and the process may be line-automated.

5) The disk mounting mechanism 50 for mounting a disk at the predetermined recording/reproducing position, or for inserting/removing the disk is comprised of the holder 51 structured so that it can move between the disk inserting/removing position and the recording/reproducing position, the lifter 52 for activating the motion of the holder 51, the spring 53 for controlling the movement of the holder 51, and the trigger 54 for detecting that the disk has been inserted to the predetermined position within the holder 51 and for allowing the holder 51 to be moved, etc. The trigger 54 is pivotally attached on the holder 51. The spring 55 for biasing the trigger 54, as well as for biasing the holder 51 toward the inserting/removing position is provided between the trigger 54 and the lifter 52 The holder 51 is provided with the plurality of protrusions 51a which engage with the plurality of guide grooves 61 on the shielding case 60. The lifter 52 also has the pair of protrusions 52a which engage with the pair of supporting grooves 62 on the shielding case 60. The holder 51 and the lifter 52 are associated so that they can be assembled from above in FIG. 1. When the disk is inserted to the predetermined recording/reproducing position, the holder 51 may be moved in the disk inserting direction in a state in which the plurality of protrusions 51a are guided by the plurality of guide grooves 61 by the activation of the trigger 54 and moves automatically to the recording/reproducing position. When the holder 51 is moved from the recording/reproducing position to the disk inserting/removing position, the pressing manipulation force of the eject button 66 is transmitted to the lifter 52 through the ejecting arm 65.

The above structure allows the disk drive apparatus to be produced by a simple assembling method by assembling the disk mounting mechanism 50 into an integral unit beforehand. It is not useful for enhancing the efficiency of other production processes, but is suitable for mounting the disk drive apparatus of the present embodiment in small devices such as notebook type personal computers because the moving pattern of the holder 51 is provided by the tension force of the spring 53 provided on the lifter 52. Spring 53 provides a turning force to lifter 52 so that lifter 52 pivots on the pair of protrusions 52a and combines with spring 55 as described above to move holder 51 to the inserting/removing position. Friction loss may be very small in the process of pressing the eject button 66 to turn the lifter 52 to move the holder 51 from the recording/reproducing position to the disk inserting/removing position (i.e., the pressing force of the eject button may be reduced and thereby the apparatus has improved operability).

6) The cover 70 for covering the shielding case 60, as well as the rear side wall 60e and the right and left side walls 60f and containing the base 1 on which the carriage mechanism 10 and the carriage driving mechanism 20 are disposed and the disk mounting mechanism 50, forms a space having sufficient ability to prevent dust and other particles from entering its inside by covering the plurality of guide grooves 61 and the pair of supporting grooves 62 on case 60, even though it is not sealed. Accordingly, the disk drive apparatus is suitable for mounting in a device such as a notebook type personal computer, which is often carried around and exposed to dust and other particles, unlike computers which are used only in a well-ordered environment such as the typical office environment.

Even if the disk drive apparatus of the present invention is mounted in an environment susceptible to electromagnetic noise caused, for example, by the overcrowded internal housing of down-sized and thinned notebook type personal computers for example, each main mechanism is disposed within a certain space defined by the shielding case 60 and the cover 70 which faces and covers the shielding case 60, so that a barrier against the effect of the electro-magnetic noise is effectively provided.

Furthermore, the first head 11 and the second head 12 are mounted on the carriage mechanism 10 and are disposed in the upper part (in the figures) of shielding case 60 within the shielding case 60, while the control circuit board 40 is disposed in the lower part (in the figures) of shielding case 60 within the shielding case 60. Moreover, the shielding case 60 intervenes between both of them, so that even a slight noise provided by one will not interfere with the other. Thus, not only the noise from the outside but also any slight noise generated from the inside are taken care of.

As described above, the head guard for preventing the pair of heads from abutting each other is inserted between the heads of the disk drive apparatus of the present invention, so that it can prevent both heads from abutting each other and from being damaged even when an outside force such as a shock is applied. If the disk drive apparatus has the shutter lever for opening and closing the shutter of the disk cartridge, the head guard conveniently may be provided on the shutter lever to provide the above function without increasing the number of parts and cost.

Furthermore, if the holder 51 is somehow forcibly moved to the recording/reproducing position due to a shock, the head guard remains located where it protects the heads and maintains a gap between the pair of heads to prevent them from abutting each other. This occurs because the head guard is moved by contact with a disk cartridge, not by movement of the holder 51. The head guard also prevents the surfaces of the heads from adhering to each other (i.e., a so-called "head pasting" phenomenon). If the heads contact each other, they tend to become adhered to each other. Therefore, excessive stress can be imparted to the structure which mounts the heads to the carriage when the adhered heads are pulled apart. By preventing the heads from contacting each other, the head guard prevents this "pasting" phenomenon from occurring. Accordingly, the disk drive apparatus having a high shock resistance and high reliability suitable for use in hard condition may be provided.

While this invention has been described in conjunction with specific embodiments thereof, it is evident that many alternatives, modifications and variations will be apparent to those skilled in the art. Accordingly, the preferred embodiments of the invention as set forth herein are intended to be illustrative, not limiting. Various changes may be made without departing from the spirit and scope of the invention as defined in the following claims.

What is claimed is:

1. A disk drive apparatus comprising:

a support for movably supporting a pair of carriages, each carriage having a head, which heads together are for pinching a magnetic disk from both sides thereof and for reading and writing information thereon, said carriages for moving said pair of heads to a desired track on the disk, said carriages being movable selectively toward and away from each other, one of said carriages having an arm section that moves through an arm path when said carriages move toward and away from each other; and a holder, supported by said support, for holding a disk cartridge containing the magnetic disk;

said holder being provided with: a head guard movable between a guarding position where said head guard is inserted in said arm path to prevent said pair of heads from abutting each other and a withdrawn position where said head guard withdraws from said arm path to that said heads can pinch the magnetic disk; said head guard biased to said guarding position; and said head guard moving from said guarding position to said withdrawn position when one end of the disk cartridge to be stored in said holder abuts with a portion of said head guard.

2. The disk drive apparatus according to claim 1, wherein said apparatus includes a shutter lever for selectively opening and closing a shutter of the disk cartridge when mounted in said holder, said head guard being attached to said shutter lever.

3. The disk drive apparatus of claim 2, wherein said head guard and said shutter lever are unitary.

4. The apparatus of claim 1, further comprising a spring attached between said holder and said head guard for biasing said head guard to said guarding position.

5. A disk drive apparatus comprising:

a first carriage having a first head attached thereto;

a second carriage having a second head attached thereto and an arm section extending outwardly from said second carriage;

a holder, mounted to a support, for receiving, positioning and holding a disk cartridge containing a magnetic disk between said first and second heads;

means for movably mounting said first and second carriages to said support so that said first and second heads can be moved radially along the disk to be position adjacent to a desired track on the disk;

means for moving said first and second carriages and respective heads from a first position where said heads ar e spaced apart from each other when the disk cartridge is not mounted in said holder to a second position where said first and second heads contact and pinch the magnetic disk from both sides thereof for reading and writing information on the magnetic disk when inserted into said holder, said arm section moving through an arm path when said first and second carriages are moved between said first and second positions; and a head guard attached to said holder for movement between a guarding position where said head guard is located in said arm path to prevent said first and second heads from abutting each other when the disk cartridge is not mounted in said holder, and a withdrawn position where said head guard is not located in said arm path when the disk cartridge is mounted in said holder.

6. The apparatus of claim 5, wherein said head guard includes:

a pin which is contacted by the disk cartridge as the disk cartridge is inserted into said holder, said pin moving with the inserted disk cartridge to move said head guard to said withdrawn position; and means for biasing said head guard toward said guarding position;

7. The apparatus of claim 6, wherein said pin is part of a shutter lever which opens a shutter of the disk cartridge as the disk cartridge is inserted into said holder, said head guard being attached to said shutter lever.

8. The apparatus of claim 7, wherein said head guard, shutter lever and pin unitary.

9. The apparatus of claim 5, wherein said means for moving said first and second carriages and respective heads from said first to said second position includes:

means for biasing said first and second carriages toward each other;

a lifting portion of said second carriage; and a supporting portion of said holder which contacts said lifting portion;

wherein said holder and said supporting portion move toward said first carriage as the disk cartridge is inserted therein so that said second carriage moves toward said first carriage to place said first and second carriages in said second position.

10. The apparatus of claim 9, wherein said arm section overlaps said head guard when said head guard is in said guarding position, but not when said head guard is in said withdrawn position.

11. The apparatus of claim 5, wherein said arm section overlaps said head guard when said head guard is in said guarding position, but not when said head guard is in said withdrawn position.

12. The apparatus of claim 5, further comprising a spring attached between said holder and said head guard for biasing said head guard to said guard position.

13. A disk cartridge holder for holding a disk cartridge containing a magnetic disk between first and second heads mounted on respective first and second carriages in a disk drive apparatus, comprising:

a frame for receiving and holding the disk cartridge;

a slot for receiving the first and second carriages of the disk drive apparatus;

a shutter lever, mounted on said frame, for opening a shutter of the disk cartridge as the disk cartridge is inserted into said frame, and having a pin that is contacted by the disk cartridge as the disk cartridge is inserted into said frame, said pin moving with the inserted disk cartridge to cause said shutter lever to open said shutter;

a head guard attached to said frame for movement between a guarding position where said head guard is located at least partially over said slot for contacting one of the first and second carriages for preventing the heads from contacting each other when the disk cartridge is not mounted in said frame, and a withdrawn position where said head guard is not located over said slot so that said head guard will not prevent the heads from contacting each other when the disk cartridge is mounted in said frame, said head guard attached to said shutter lever so as to move to said withdrawn position as said pin moves said shutter lever; and means for biasing said head guard toward said guarding position.

14. The apparatus of claim 13, wherein said head guard, shutter lever and pin unitary.

15. The apparatus of claim 13, further comprising a spring attached between said frame and said head guard for biasing said head guard to said guarding position.

16. A disk drive apparatus comprising:
a support for movably supporting a pair of carriages, each carriage having a head, which heads together are for pinching a magnetic disk from both sides thereof and for reading and writing information thereon, said carriages for moving said pair of heads to a desired track on the disk;
a holder, supported by said support, for holding a disk cartridge containing the magnetic disk;
a shutter lever, mounted on said holder, for selectively opening and closing a shutter of the disk cartridge when mounted in said holder;
said holder being provided with: a head guard, attached to said shutter lever, and movable between a guarding position where said head guard is inserted between said pair of heads to prevent said pair of heads from abutting each other and a withdrawn position where said head guard withdraws from between said pair of heads; said head guard biased to said guarding position; and
said head guard moving from said guarding position to said withdrawn position when one end of the disk cartridge to be stored in said holder abuts with a portion of said head guard.

17. The apparatus of claim 16, further comprising a spring attached between said holder and said head guard for biasing said head guard to said guarding position.

18. The apparatus of claim 16, wherein said head guard and said shutter lever are unitary.

* * * * *